US009835891B2

(12) United States Patent
Liu

(10) Patent No.: US 9,835,891 B2
(45) Date of Patent: Dec. 5, 2017

(54) LIQUID CRYSTAL DISPLAY PANEL COMPRISING QUANTUM RODS AND LIQUID CRYSTAL MOLECULES WHEREIN LONG AXES OF THE QUANTUM RODS AND LIQUID CRYSTAL MOLECULES ARE IN THE SAME DIRECTION AND METHOD OF FORMING THE SAME

(71) Applicant: SHENZHEN CHINA STAR OPTOELECTRONICS TECHNOLOGY CO., LTD., Shenzhen, Guangdong (CN)

(72) Inventor: Guohe Liu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 219 days.

(21) Appl. No.: 14/787,351

(22) PCT Filed: Oct. 15, 2015

(86) PCT No.: PCT/CN2015/092000
§ 371 (c)(1),
(2) Date: Oct. 27, 2015

(87) PCT Pub. No.: WO2017/028371
PCT Pub. Date: Feb. 23, 2017

(65) Prior Publication Data
US 2017/0255051 A1    Sep. 7, 2017

(30) Foreign Application Priority Data
Aug. 17, 2015  (CN) .......................... 2015 1 0504422

(51) Int. Cl.
*G02F 1/1333* (2006.01)
*G02F 1/1368* (2006.01)
(Continued)

(52) U.S. Cl.
CPC ...... *G02F 1/133377* (2013.01); *G02F 1/1341* (2013.01); *G02F 1/1368* (2013.01);
(Continued)

(58) Field of Classification Search
CPC ......... G02F 1/133377; G02F 1/133621; G02F 2202/36; G02F 2201/52;
(Continued)

(56) References Cited

U.S. PATENT DOCUMENTS

2011/0299001 A1* 12/2011 Banin .................... B82Y 20/00
349/33
2013/0107170 A1* 5/2013 Gee ...................... G02F 1/13362
349/65
(Continued)

FOREIGN PATENT DOCUMENTS

CN    104330918 A    2/2015
CN    104680942 A    6/2015
(Continued)

*Primary Examiner* — Paul Lee
(74) *Attorney, Agent, or Firm* — Ladas & Parry LLP

(57) ABSTRACT

The present invention proposes an LCD panel and a method for forming the same. The LCD panel includes an isolator disposed between two adjacent liquid crystal units. Liquid crystal molecules of red liquid crystal units and green liquid crystal units are mixed with quantum rods (QRs) of corresponding colors. The red liquid crystal units correspond to a position of the red pixels, the green liquid crystal units correspond to a position of the green pixels. The QRs and liquid crystal molecules have long axes and directions of the long axes of QRs and liquid crystal molecules are the same.

17 Claims, 2 Drawing Sheets

(51) Int. Cl.
*G02F 1/1341* (2006.01)
*G02F 1/1339* (2006.01)
*G02F 1/1335* (2006.01)
*G02F 1/1362* (2006.01)

(52) U.S. Cl.
CPC .... *G02F 1/13394* (2013.01); *G02F 1/133528* (2013.01); *G02F 1/133621* (2013.01); *G02F 1/136286* (2013.01); *G02F 2001/13398* (2013.01); *G02F 2001/13415* (2013.01); *G02F 2001/133531* (2013.01); *G02F 2001/133614* (2013.01); *G02F 2201/52* (2013.01); *G02F 2202/36* (2013.01)

(58) Field of Classification Search
CPC ........ G02F 2001/133614; G02F 2001/133531; G02F 2001/13415
See application file for complete search history.

(56) References Cited

U.S. PATENT DOCUMENTS

| | | | |
|---|---|---|---|
| 2013/0135558 A1* | 5/2013 | Kim | G02F 1/133528 349/62 |
| 2013/0341588 A1* | 12/2013 | Jeon | G02F 1/174 257/13 |
| 2014/0340865 A1* | 11/2014 | Hikmet | G02F 1/133533 362/19 |
| 2015/0009440 A1* | 1/2015 | Lee | G02F 2/02 349/42 |
| 2015/0146452 A1 | 5/2015 | Kim et al. | |
| 2016/0357068 A1 | 12/2016 | Yang et al. | |
| 2017/0146858 A1 | 5/2017 | Liu | |

FOREIGN PATENT DOCUMENTS

| | | |
|---|---|---|
| CN | 105093623 A | 11/2015 |
| KR | 20130047199 A | 5/2013 |

* cited by examiner

LIQUID CRYSTAL DISPLAY PANEL COMPRISING QUANTUM RODS AND LIQUID CRYSTAL MOLECULES WHEREIN LONG AXES OF THE QUANTUM RODS AND LIQUID CRYSTAL MOLECULES ARE IN THE SAME DIRECTION AND METHOD OF FORMING THE SAME

BACKGROUND OF THE INVENTION

1. Field of the Invention

The present invention relates to liquid crystal display (LCD) technology, and more specifically, to a LCD panel and a method of forming the same.

2. Description of the Prior Art

Quantum rod (QR), like quantum dot (QD), is a nanomaterial formed by a limited number of semiconductor atoms. Different from quasi-zero-dimensional QD, QR is a one dimensional material whose size in one direction is far larger than that in the other two directions. The structural anisotropy results in an optical anisotropy, which is unique to QR materials. The optical anisotropy refers to the fact that the direction of the long axis of the QR is much more capable than the direction perpendicular to the long axis in light absorption and emission. The polarization efficiency of QRs can be as high as 96%, equivalent to the polarization efficiency of iodine-based polarizers, which is the mainstream.

An alignment of QRs is needed during the application process to ensure that all QRs are parallel to the same direction, so to fully make use of the optical anisotropy of the QRs. Currently, the QRs are aligned by thin film extension technology, which requires independent production of extension thin films and introduction of extension technology. The production process is more complicated and the QR alignment efficiency is low. In addition, current display appliances can only show a limited variety of colors, instead of different greyscale images of the same color.

Therefore, it is necessary to provide a LCD panel and a method of forming the same to solve the problems with the existing technology.

SUMMARY OF THE INVENTION

An object of the present invention is to provide a LCD panel and a method of forming the same to solve problems with the existing technology of LCD panels, including low color gamut and high production cost.

According to the present invention, a liquid crystal display (LCD) panel, comprises a first substrate, a second substrate, a second polarizer, and a liquid crystal layer. The first substrate comprises a first base substrate, an isolation layer, disposed on the first base substrate, comprising a plurality of isolators, and a first polarizer, disposed on an external side of the first substrate. The second substrate is disposed opposite to the first substrate. The second substrate comprises a switch array layer, data lines and scan lines surrounding a plurality of pixel units comprising red, green and blue pixels. The switch array layer comprises a plurality of thin film transistors. The second polarizer is disposed on an external side of the second substrate. The liquid crystal layer comprises one or more red liquid crystal units, one or more green liquid crystal units and one or more blue liquid crystal units. One of the isolators is disposed between two adjacent liquid crystal units. Liquid crystal molecules of the red liquid crystal units and green liquid crystal units are mixed with quantum rods (QRs) of corresponding colors. The red liquid crystal units correspond to a position of the red pixels, the green liquid crystal units correspond to a position of the green pixels, and the blue liquid crystal units correspond to a position of the blue pixels. The QRs and liquid crystal molecules have long axes and directions of the long axes of QRs and liquid crystal molecules are the same.

When the TFTs are closed, the QRs, along with the liquid crystal molecules, align in a twisted manner spanning from the second substrate to the side of the first substrate. Under light of a backlight source, the polarization direction of the second polarizer is the same as the long axes of the QRs close to the side of the second substrate. The QRs rotate with the liquid crystal molecules, so that the direction of the long axes of the QRs close to the side of the first substrate is the same as the polarization direction of the first polarizer. The LCD panel is in a first state of brightness. Spacers are disposed on the first substrate; the material of the spacers is the same as the isolators.

Furthermore, the liquid crystal molecules of the red liquid crystal units are mixed with red QRs. The liquid crystal molecules of the green liquid crystal units are mixed with green QRs. The liquid crystal molecules of the blue liquid crystal units are mixed with blue QRs. The backlight source emits white light to the LCD panel.

Furthermore, the liquid crystal molecules of the red liquid crystal units are mixed with red QRs. The liquid crystal molecules of the green liquid crystal units are mixed with green QRs. The liquid crystal molecules of the blue liquid crystal units are not mixed with QRs. The backlight source emits blue light to the LCD panel.

Furthermore, when the TFTs are not fully opened, the QRs, along with the liquid crystal molecules, align in a twisted manner spanning from the second substrate to the side of the first substrate. Under the light of the backlight source, the polarization direction of the second polarizer and the long axes of the QRs close to the side of the second substrate form a set angle. The QRs turn with the liquid crystal molecules, so that the long axes of the QRs close to the side of the first substrate and the polarization direction of the first polarizer form a set angle. The LCD panel is in a second state of brightness.

Furthermore, when the TFTs are fully opened, the QRs, along with the liquid crystal molecules, turn to align perpendicularly to the first substrate spanning from the second substrate to the side of the first substrate. Under the light of the backlight source, the polarization direction of the second polarizer is perpendicular to the long axes of the QRs close to the second substrate, while the long axes of the QRs close to the first substrate is perpendicular to the polarization direction of the first polarizer. The LCD panel is in a third state of brightness. The first state of brightness is larger the second state of brightness, and the second state of brightness is larger than the third state of brightness.

Furthermore, the LCD panel further comprises a color resist layer, disposed on the first base substrate, comprising a red color film, a green color film, and a blue color film.

Furthermore, the LCD panel further comprises a black matrix between two adjacent color films.

According to the present invention, a liquid crystal display (LCD) panel, comprises a first substrate, a second substrate, and a liquid crystal layer. The first substrate comprises a first base substrate, and an isolation layer, disposed on the first base substrate, comprising a plurality of isolators. The second substrate, disposed opposite to the first substrate, comprises data lines and scan lines surrounding a plurality of pixel units comprising red, green and blue pixels. The liquid crystal layer comprises one or more red liquid crystal units, one or more green liquid crystal units and one or more blue liquid crystal units. One of the isolators is disposed between two adjacent liquid crystal units. Liquid crystal molecules of the red liquid crystal units and green liquid crystal units are mixed with quantum rods (QRs) of corresponding colors. The red liquid crystal units correspond to a position of the red pixels, the green liquid crystal units correspond to a position of the green pixels, and the blue liquid crystal units correspond to a position of the blue pixels. The QRs and liquid crystal molecules have long axes and directions of the long axes of QRs and liquid crystal molecules are the same.

Furthermore, the liquid crystal molecules of the red liquid crystal units are mixed with red QRs. The liquid crystal molecules of the green liquid crystal units are mixed with green QRs. The liquid crystal molecules of the blue liquid crystal units are mixed with blue QRs. A backlight source emits white light to the LCD panel.

Furthermore, the liquid crystal molecules of the red liquid crystal units are mixed with red QRs. The liquid crystal molecules of the green liquid crystal units are mixed with green QRs. The liquid crystal molecules of the blue liquid crystal units are not mixed with QRs. A backlight source emits blue light to the LCD panel.

Furthermore, the second substrate further comprises a switch array layer comprising a plurality of thin film transistors (TFTs). A second polarizer is disposed on an external side of the second substrate, and a first polarizer is disposed on an external side of the first substrate.

When the TFTs are closed, the QRs, along with the liquid crystal molecules, align in a twisted manner spanning from the second substrate to the side of the first substrate. Under the light of the backlight source, the polarization direction of the second polarizer is the same as the long axes of the QRs close to the side of the second substrate. The QRs rotate with the liquid crystal molecules, so that the direction of the long axes of the QRs close to the side of the first substrate is the same as the polarization direction of the first polarizer. The LCD panel is in a first state of brightness.

When the TFTs are not fully opened, the QRs, along with the liquid crystal molecules, align in a twisted manner spanning from the second substrate to the side of the first substrate. Under the light of the backlight source, the polarization direction of the second polarizer and the long axes of the QRs close to the side of the second substrate form a set angle; the QRs turn with the liquid crystal molecules, so that the long axes of the QRs close to the side of the first substrate and the polarization direction of the first polarizer form a set angle. The LCD panel is in a second state of brightness.

When the TFTs are fully opened, the QRs, along with the liquid crystal molecules, turn to align perpendicularly to the first substrate spanning from the second substrate to the side of the first substrate. Under the light of the backlight source, the polarization direction of the second polarizer is perpendicular to the long axes of the QRs close to the second substrate, while the long axes of the QRs close to the first substrate is perpendicular to the polarization direction of the first polarizer. The LCD panel is in a third state of brightness.

The first state of brightness is larger the second state of brightness, and the second state of brightness is larger than the third state of brightness.

Furthermore, spacers are disposed on the first substrate; the material of the spacers is the same as the isolators.

According to the present invention, a method of forming a liquid crystal display (LCD) panel comprises: forming isolators on the first substrate through lithography; dripping the liquid crystal molecules mixed with the red quantum rods (QRs) to the position corresponding to the red pixels, and the liquid crystal molecules mixed with the green QRs to the position corresponding to the green pixels by means of ink-jetting, wherein the liquid crystal molecules are mixed with at least the red and green QRs.

Furthermore, the liquid crystal molecules are further mixed with blue QRs; dripping the liquid crystal molecules mixed with the blue QRs to the position corresponding to the blue pixels by means of ink-jetting.

Furthermore, the method comprises dripping the liquid crystal molecules that are not mixed with the QRs to the position corresponding to the blue pixels by means of ink-jetting.

Furthermore, the second substrate further comprises a switch array layer comprising a plurality of thin film transistors (TFTs). A second polarizer is disposed on an external side of the second substrate, and a first polarizer is disposed on an external side of the first substrate.

When the TFTs are closed, the QRs, along with the liquid crystal molecules, align in a twisted manner spanning from the second substrate to the side of the first substrate. Under the light of the backlight source, the polarization direction of the second polarizer is the same as the long axes of the QRs close to the side of the second substrate. The QRs rotate with the liquid crystal molecules, so that the direction of the long axes of the QRs close to the side of the first substrate is the same as the polarization direction of the first polarizer. The LCD panel is in a first state of brightness.

When the TFTs are not fully opened, the QRs, along with the liquid crystal molecules, align in a twisted manner spanning from the second substrate to the side of the first substrate. Under the light of the backlight source, the polarization direction of the second polarizer and the long axes of the QRs close to the side of the second substrate form a set angle; the QRs turn with the liquid crystal molecules, so that the long axes of the QRs close to the side of the first substrate and the polarization direction of the first polarizer form a set angle. The LCD panel is in a second state of brightness.

When the TFTs are fully opened, the QRs, along with the liquid crystal molecules, turn to align perpendicularly to the first substrate spanning from the second substrate to the side of the first substrate. Under the light of the backlight source, the polarization direction of the second polarizer is perpendicular to the long axes of the QRs close to the second substrate, while the long axes of the QRs close to the first substrate is perpendicular to the polarization direction of the first polarizer. The LCD panel is in a third state of brightness.

The first state of brightness is larger the second state of brightness, and the second state of brightness is larger than the third state of brightness.

Furthermore, spacers are disposed on the first substrate; the material of the spacers is the same as the isolators.

The present invention provides a LCD panel and a method of forming the same. By mixing QRs of a color identical to pixels with the crystal molecules at a position corresponding to the pixels, the present invention enhances the transmittance of polarizers and color gamut of the LCD panel, and lowers the production cost.

DETAILED DESCRIPTION OF PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
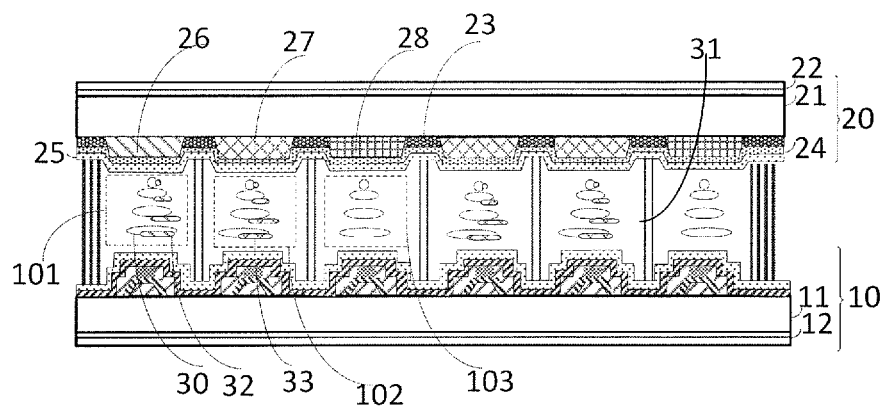
FIG. 1 is a schematic diagram of a liquid crystal display panel according to a first preferred embodiment of the present invention.

Please refer to FIG. 1. FIG. 1 is a structure diagram of a LCD panel of a first embodiment of the present invention.

The LCD panel of the present invention comprises a first substrate 20, a second substrate 10, and a liquid crystal layer, disposed between the first substrate 20 and the second substrate 10. The first substrate 20, e.g. is a color film substrate, and the second substrate 10, e.g. is an array substrate. The first substrate 20 comprises a first base substrate 21, and a first polarizer 22 disposed on an external side of the first substrate. A color resist layer can further be disposed on the first base substrate. The color resist layer comprises a red color film 26, green color film 27 and blue color film 28. A black matrix 23 can be disposed between two adjacent color films. An insulation layer 24 and a transparent conducting layer 25 are installed on the color resist layer.

An isolation layer is disposed on the transparent conducting layer 25. The isolation layer comprises a plurality of isolators 31.

The second substrate 10 and the first substrate 20 are disposed opposite to each other. The second substrate 10 comprises a second base substrate 11, and a switch array layer on the second base substrate 11. The switch array layer comprises a plurality of thin film transistors (TFTs).

Figure 2:
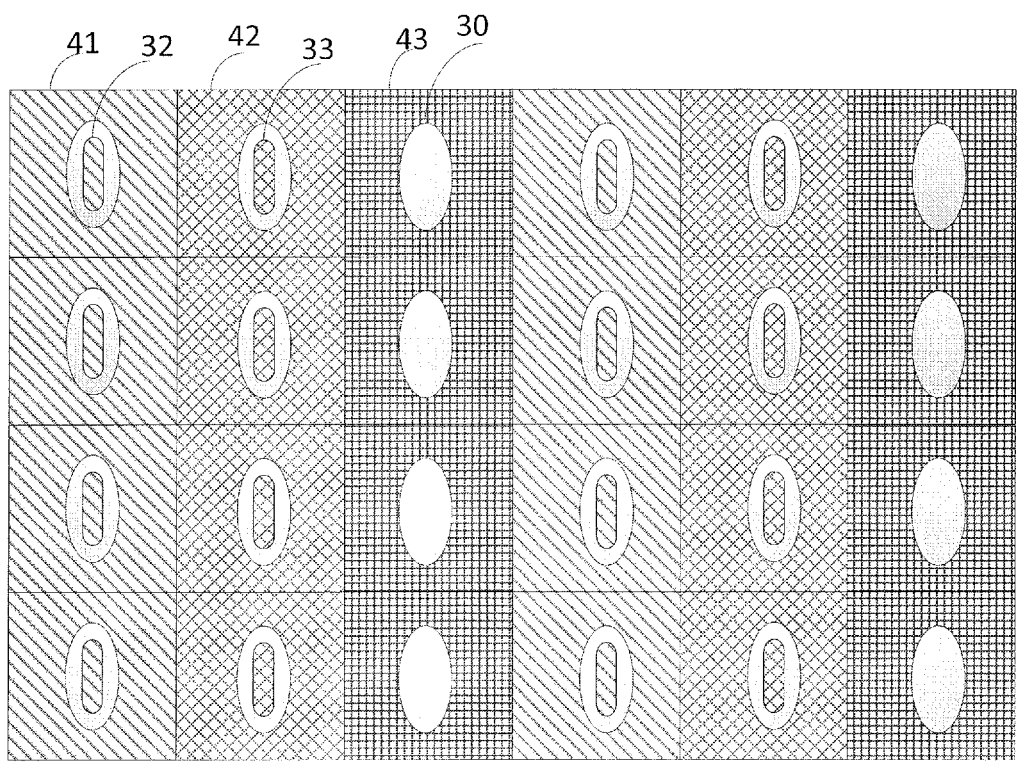
FIG. 2 is a top view of a liquid crystal display panel according to the first preferred embodiment of the present invention.

The second substrate 10 further comprises data lines and scan lines, and a plurality of pixel units defined by the data lines and scan lines. The pixel units comprise red, green and blue pixel units. FIG. 2 shows the pixel units comprising red pixels 41, green pixels 42 and blue pixels 43.

As shown in FIG. 1, the liquid crystal layer comprises one or more red liquid crystal unit 101, green liquid crystal unit 102 and blue liquid crystal unit 103. One of the isolators 31 is disposed between two adjacent liquid crystal units. For example, an isolator 31 is disposed between the red liquid crystal unit 101 and green liquid crystal unit 102. The isolators 31 are used to prevent crosstalk of two adjacent liquid crystal units when beams of a backlight source reach them.

Liquid crystal molecules 30 of the red liquid crystal unit 101 are mixed with red QRs 32. Liquid crystal molecules 30 of the green liquid crystal unit 102 are mixed with green QRs 33. Liquid crystal molecules 30 of the blue liquid crystal unit 103 are not mixed with QRs of any color.

The position of the red liquid crystal unit 101 corresponds to that of the red pixels 41 or the red color film. The position of the green liquid crystal unit 102 corresponds to that of the green pixels 42. The position of the blue liquid crystal unit 103 corresponds to that of the blue pixels 43.

The red QRs, green QRs, and the liquid crystal molecules all have long axes, which are all in the same direction. Due to the influence of anchoring force, the long axes of the QRs will always align along the long axes of the liquid crystal molecules. The LCD panel of the present invention needs a blue backlight source.

Of course, it is fine not to dispose a color resist film on top of the first substrate 20. After the blue backlight activates the red and green QRs mixed in the liquid crystal layer, the red and green QRs generate red and green light. Along with the blue backlight, they form the light source needed by the LCD panel to display.

The method of forming the LCD panel of the present invention comprises the following steps:

S101: make use of the lithography process to form isolators on the first substrate.

First, form black matrixes, color resist films and a transparent conducting layer on the first base substrate 21. Form the isolators after the transparent conducting layer is completed. On the transparent conducting layer, spacers can also be installed which can be supportive when the panel is pressured. The isolators 31 can be formed with the same materials as the spacers.

S102: By means of ink-jetting, drip the liquid crystal molecules mixed with the red QRs 32 to the position corresponding to that of the red pixels 41; drip the liquid crystal molecules mixed with the green QRs 33 to the position corresponding to that of the green pixels 42; drip pure liquid crystal molecules to the position corresponding to that of the blue pixels 43.

The LCD panel of the present embodiment is a twist nematic (TN) LCD panel.

Please refer to FIG. 1. When scan signals are at a low voltage level, the TFTs are closed. Without an electric field, the QRs, along with the liquid crystal molecules, are aligned in a manner twisted to a certain extent, with the QRs spanning from the second substrate 10 to the side of the first substrate 20. When the backlight source passes through the second polarizer 12 and shines on the liquid crystal layer, it is transformed from a non-polarized light to a polarized light, so that the polarization direction of the second polarizer 12 is the same as the long axes of the QRs close to the side of the second substrate 10. At this point, the red QRs 32 and green QRs 33 are most capable of light absorption and emission. Activated by the polarized light, the red QRs 32 and green QRs 33 emitted polarized red light and green light respectively. When the red light and green light reach the first polarizer 22, their polarization direction has been gradually turned, along with the liquid crystal molecules, to the polarization direction of the first polarizer 22. It is when the LCD panel is the brightest (the first brightness state). The present invention adds QRs and makes use of the optical anisotropy of the QRs, so that the LCD panel is brighter than the TN display model of current LCD panels.

When TFTs are not fully opened, the QRs, along with the liquid crystal molecules, align in a twisted manner spanning from the second substrate to the side of the first substrate. Under the light of the backlight source, the polarization direction of the second substrate and the long axes of the QRs close to the side of the second substrate form a set angle. At this point, the red QRs 32 and green QRs 33 are not very capable of light absorption and emission. Activated by the polarized light, the red QRs and green QRs emit polarized red and green light respectively. When the red and green light reach the first polarizer, the polarization direction has been gradually turned with the liquid crystal molecules, so it forms a set angle with the polarization direction of the first polarizer. It is when the LCD is in a brighter state (a second brightness state). In this state, because of the QRs, the LCD panel is brighter than when there were only liquid crystal molecules.

Figure 3:
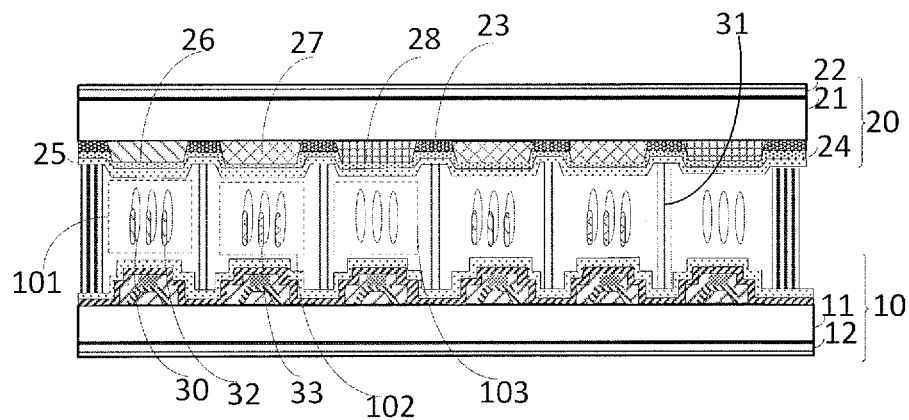
FIG. 3 shows a schematic diagram of a liquid crystal display panel when the thin film transistors are all fully opened according to the first preferred embodiment of the present invention.

Please refer to FIG. 3. When scan signals are at a high voltage level, the TFTs are fully opened. Under the effect of the electric field, the liquid crystal molecules turn to the position as shown in FIG. 3. Meanwhile, the QRs, along with the liquid crystal molecules, turn to be lined perpendicularly to the first substrate 20. When the backlight source passes through the second polarizer 12 and shines on the liquid crystal layer, because the polarization direction of the light is perpendicular to the direction of the long axes of the liquid crystal molecules and the QRs, light absorption and emission of the red QRs 32 and green QRs 33 are very weak. Therefore, the QRs almost have no influence on the polarization status of the light. When the light passes through the first polarizer 22, the polarization direction of the light is perpendicular to that of the first polarizer 22. It is when the liquid crystal layer is in its darkest state (the third brightness state).

By adding the QRs, part of the polarized light changes its direction from perpendicular to parallel, which enhanced the transmittance of the polarizers effectively. In addition, QRs of a color identical to pixels were added to the position corresponding to the specific pixels, effectively enhancing the color saturation and gamut, making the color of the LCD panel more vivid.

Figure 4:
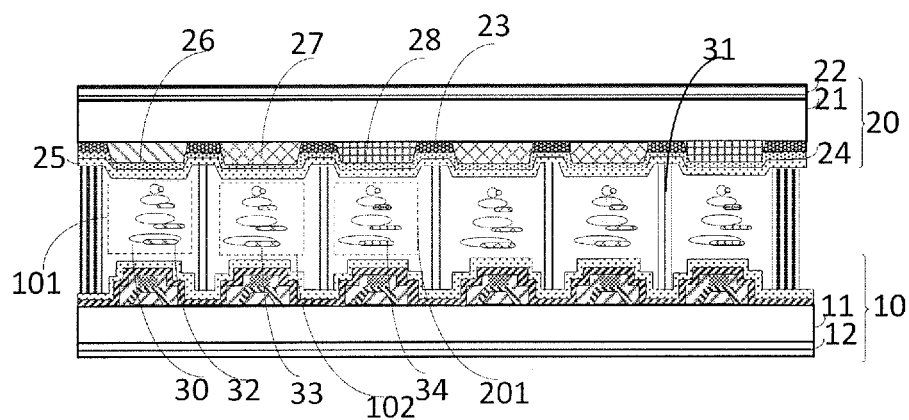
FIG. 4 is a schematic diagram of a liquid crystal display panel according to a second preferred embodiment of the present invention.

Please refer to FIG. 4. FIG. 4 is a structure diagram of a LCD panel of a second embodiment of the present invention.

The LCD panel of the present invention comprises a first substrate 20, a second substrate 10, and a liquid crystal layer, disposed between the first substrate 20 and the second substrate 10. The first substrate 20, e.g. is a color film substrate, and the second substrate 10, e.g. is an array substrate. The first substrate 20 comprises a first base substrate 21, and a first polarizer 22 disposed on an external side of the first substrate. A color resist layer can further be disposed on the first base substrate. The color resist layer comprises a red color film 26, green color film 27 and blue color film 28. A black matrix 23 can be disposed between two adjacent color films. An insulation layer 24 and a transparent conducting layer 25 are installed on the color resist layer.

An isolation layer is disposed on the transparent conducting layer 25. The isolation layer comprises a plurality of isolators 31.

The second substrate 10 and the first substrate 20 are disposed opposite to each other. The second substrate 10 comprises a second base substrate 11, and a switch array layer on the second base substrate 11. The switch array layer comprises a plurality of thin film transistors (TFTs).

The second substrate 10 further comprises data lines and scan lines, and a plurality of pixel units defined by the data lines and scan lines. The pixel units comprise red, green and blue pixel units. FIG. 2 shows the pixel units comprising red pixels 41, green pixels 42 and blue pixels 43.

As shown in FIG. 4, the liquid crystal layer comprises one or more red liquid crystal unit 101, green liquid crystal unit 102 and blue liquid crystal unit 201. One of the isolators 31 is disposed between two adjacent liquid crystal units. For example, an isolator 31 is disposed between the red liquid crystal unit 101 and green liquid crystal unit 102. The isolators 31 are used to prevent crosstalk of two adjacent liquid crystal units when beams of a backlight source reach them.

Liquid crystal molecules 30 of the red liquid crystal unit 101 are mixed with red QRs 32. Liquid crystal molecules 30 of the green liquid crystal unit 102 are mixed with green QRs 33. Liquid crystal molecules 30 of the blue liquid crystal unit 201 are mixed with blue QRs 34.

The position of the red liquid crystal unit 101 corresponds to that of the red pixels 41 or the red color film. The position of the green liquid crystal unit 102 corresponds to that of the green pixels 42 or the green color film. The position of the blue liquid crystal unit 201 corresponds to that of the blue pixels 43 or the blue color film.

The red QRs, green QRs, blue QRs and the liquid crystal molecules all have long axes, which are all in the same direction. Due to the influence of anchoring force, the long axes of the QRs will always align along the long axes of the liquid crystal molecules. The LCD panel of the present invention needs a backlight source emitting white light.

Of course, it is fine not to dispose a color resist film on top of the first substrate 20. After the white backlight activates the red, green and blue QRs mixed in the liquid crystal layer, the red and green QRs generate red, green, and blue light. Along with the white backlight, they form the light source needed by the LCD panel to display.

The method of forming the LCD panel of the present invention comprises the following steps:

S101: make use of the lithography process to form isolators on the first substrate.

First, form black matrixes, color resist films and a transparent conducting layer on the first base substrate 21. Form the isolators after the transparent conducting layer is completed. On the transparent conducting layer, spacers can also be installed which can be supportive when the panel is pressured. The isolators 31 can be formed with the same materials as the spacers.

S102: By means of ink-jetting, drip the liquid crystal molecules mixed with the red QRs 32 to the position corresponding to that of the red pixels 41; drip the liquid crystal molecules mixed with the green QRs 33 to the position corresponding to that of the green pixels 42; drip liquid crystal molecules mixed with the blue QRs 34 to the position corresponding to that of the blue pixels 43.

The LCD panel of the present embodiment is a twist nematic (TN) LCD panel.

Please refer to FIG. 4. When scan signals are at a low voltage level, the TFTs are closed. Without an electric field, the QRs, along with the liquid crystal molecules, are aligned in a manner twisted to a certain extent, with the QRs spanning from the second substrate 10 to the side of the first substrate 20. When the backlight source passes through the second polarizer 12 and shines on the liquid crystal layer, it is transformed from a non-polarized light to a polarized light, so that the polarization direction of the second polarizer 12 is the same as the long axes of the QRs close to the side of the second substrate 10. At this point, the red QRs 32, green QRs 33, and blue QRs 34 are most capable of light absorption and emission. Activated by the polarized light, the red QRs 32, green QRs 33, and blue QRs 34 emitted polarized red light, green light, and blue light respectively. When the red light and green light reach the first polarizer 22, their polarization direction has been gradually turned, along with the liquid crystal molecules, to the polarization direction of the first polarizer 22. It is when the LCD panel is the brightest (the first brightness state). The present invention adds QRs and makes use of the optical anisotropy of the QRs, so that the LCD panel is brighter than the TN display model of current LCD panels.

When TFTs are not fully opened, the QRs, along with the liquid crystal molecules, align in a twisted manner spanning from the second substrate to the side of the first substrate. Under the light of the backlight source, the polarization direction of the second substrate and the long axes of the QRs close to the side of the second substrate form a set angle. At this point, the red QRs 32, green QRs 33 and blue QRs 34 are not very capable of light absorption and emission. Activated by the polarized light, the red QRs, green QRs, and blue QRs emit polarized red, green, blue light, respectively. When the red, green, and blue light reach the first polarizer, the polarization direction has been gradually turned with the liquid crystal molecules, so it forms a set angle with the polarization direction of the first polarizer. It is when the LCD is in a brighter state (a second brightness state). In this state, because of the QRs, the LCD panel is brighter than when there were only liquid crystal molecules.

Figure 5:
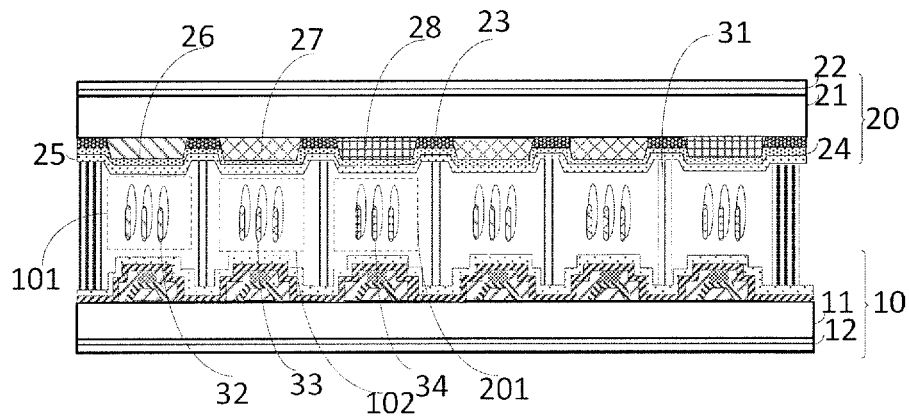
FIG. 5 shows a schematic diagram of a liquid crystal display panel when the thin film transistors are all fully opened according to the second preferred embodiment of the present invention.

Please refer to FIG. 5. When scan signals are at a high voltage level, the TFTs are fully opened. Under the effect of the electric field, the liquid crystal molecules turn to the position as shown in FIG. 5, i.e., the liquid crystal molecules align in a vertical direction. Meanwhile, the QRs, along with the liquid crystal molecules, turn to be lined perpendicularly to the first substrate 20 or the second substrate 10. When the backlight source passes through the second polarizer 12 and shines on the liquid crystal layer, because the polarization direction of the light is perpendicular to the direction of the long axes of the liquid crystal molecules and the QRs, light absorption and emission of the red QRs 32, green QRs 33, and blue QRs 34 are very weak. Therefore, the QRs almost have no influence on the polarization status of the light. When the light passes through the first polarizer 22, the polarization direction of the light is perpendicular to that of the first polarizer 22. It is when the liquid crystal layer is in its darkest state (the third brightness state). The first brightness state is brighter than the second brightness state, and the second brightness state is brighter than the third brightness state.

By adding the QRs, part of the polarized light changes its direction from perpendicular to parallel, which enhanced the transmittance of the polarizers effectively. In addition, QRs of a color identical to pixels were added to the position corresponding to the specific pixels, effectively enhancing the color saturation and gamut, making the color of the LCD panel more vivid.

The present invention provides LCD panels, and a method of forming the same. It mixes QRs of a color identical to pixels with liquid crystal molecules at the position corresponding to the specific pixels, so to enhance the transmittance of the polarizers and the color gamut of the LCD panel. Furthermore, it can lower the production cost for it does not need to produce extension thin film and introduce extension technology.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display (LCD) panel, comprising:
a first substrate, comprising:
a first base substrate;
an isolation layer, disposed on the first base substrate, comprising a plurality of isolators; and
a first polarizer, disposed on an external side of the first substrate;
a second substrate, disposed opposite to the first substrate, comprising a switch array layer, data lines and scan lines surrounding a plurality of pixel units comprising red, green and blue pixels, the switch array layer comprising a plurality of thin film transistors;
a second polarizer, disposed on an external side of the second substrate; and
a liquid crystal layer, comprising one or more red liquid crystal units, one or more green liquid crystal units and one or more blue liquid crystal units, wherein one of the isolators is disposed between two adjacent liquid crystal units;
wherein liquid crystal molecules of the red liquid crystal units and green liquid crystal units are mixed with quantum rods (QRs) of corresponding colors; the red liquid crystal units correspond to a position of the red pixels, the green liquid crystal units correspond to a position of the green pixels, and the blue liquid crystal units correspond to a position of the blue pixels; the QRs and liquid crystal molecules have long axes and directions of the long axes of QRs and liquid crystal molecules are the same,
wherein when the TFTs are closed, the QRs, along with the liquid crystal molecules, align in a twisted manner spanning from the second substrate to the side of the first substrate; under light of a backlight source, the polarization direction of the second polarizer is the same as the long axes of the QRs close to the side of the second substrate; the QRs rotate with the liquid crystal molecules, so that the direction of the long axes of the QRs close to the side of the first substrate is the same as the polarization direction of the first polarizer; the LCD panel is in a first state of brightness, and
wherein spacers are disposed on the first substrate; the material of the spacers is the same as the isolators.

2. The LCD panel of claim 1, wherein the liquid crystal molecules of the red liquid crystal units are mixed with red QRs; the liquid crystal molecules of the green liquid crystal units are mixed with green QRs; the liquid crystal molecules of the blue liquid crystal units are mixed with blue QRs; the backlight source emits white light to the LCD panel.

3. The LCD panel of claim 1, wherein the liquid crystal molecules of the red liquid crystal units are mixed with red QRs; the liquid crystal molecules of the green liquid crystal units are mixed with green QRs; the liquid crystal molecules of the blue liquid crystal units are not mixed with QRs; a backlight source emits blue light to the LCD panel.

4. The LCD panel of claim 1, wherein when the TFTs are not fully opened, the QRs, along with the liquid crystal molecules, align in a twisted manner spanning from the second substrate to the side of the first substrate; under the light of the backlight source, the polarization direction of the second polarizer and the long axes of the QRs close to the side of the second substrate form a set angle; the QRs turn with the liquid crystal molecules, so that the long axes of the QRs close to the side of the first substrate and the polarization direction of the first polarizer form a set angle; the LCD panel is in a second state of brightness.

5. The LCD panel of claim 4, wherein when the TFTs are fully opened, the QRs, along with the liquid crystal molecules, turn to align perpendicularly to the first substrate spanning from the second substrate to the side of the first substrate; under the light of the backlight source, the polarization direction of the second polarizer is perpendicular to the long axes of the QRs close to the second substrate, while the long axes of the QRs close to the first substrate is perpendicular to the polarization direction of the first polarizer; the LCD panel is in a third state of brightness;
  wherein the first state of brightness is larger the second state of brightness, and the second state of brightness is larger than the third state of brightness.

6. The LCD panel of claim 1 further comprising a color resist layer, disposed on the first base substrate, comprising a red color film, a green color film, and a blue color film.

7. The LCD panel of claim 6 further comprising a black matrix between two adjacent color films.

8. A liquid crystal display (LCD) panel, comprising:
  a first substrate, comprising:
    a first base substrate; and
    an isolation layer, disposed on the first base substrate, comprising a plurality of isolators;
  a second substrate, disposed opposite to the first substrate, comprising data lines and scan lines surrounding a plurality of pixel units comprising red, green and blue pixels; and
  a liquid crystal layer, comprising one or more red liquid crystal units, one or more green liquid crystal units and one or more blue liquid crystal units, wherein one of the isolators is disposed between two adjacent liquid crystal units;
  wherein liquid crystal molecules of the red liquid crystal units and green liquid crystal units are mixed with quantum rods (QRs) of corresponding colors; the red liquid crystal units correspond to a position of the red pixels, the green liquid crystal units correspond to a position of the green pixels, and the blue liquid crystal units correspond to a position of the blue pixels; the QRs and liquid crystal molecules have long axes and directions of the long axes of QRs and liquid crystal molecules are the same.

9. The LCD panel of claim 8, wherein the liquid crystal molecules of the red liquid crystal units are mixed with red QRs; the liquid crystal molecules of the green liquid crystal units are mixed with green QRs; the liquid crystal molecules of the blue liquid crystal units are mixed with blue QRs; a backlight source emits white light to the LCD panel.

10. The LCD panel of claim 8, wherein the liquid crystal molecules of the red liquid crystal units are mixed with red QRs; the liquid crystal molecules of the green liquid crystal units are mixed with green QRs; the liquid crystal molecules of the blue liquid crystal units are not mixed with QRs; a backlight source emits blue light to the LCD panel.

11. The LCD panel of claim 8, wherein the second substrate further comprises a switch array layer comprising a plurality of thin film transistors (TFTs); a second polarizer is disposed on an external side of the second substrate, and a first polarizer is disposed on an external side of the first substrate;
  when the TFTs are closed, the QRs, along with the liquid crystal molecules, align in a twisted manner spanning from the second substrate to the side of the first substrate; under the light of the backlight source, the polarization direction of the second polarizer is the same as the long axes of the QRs close to the side of the second substrate; the QRs rotate with the liquid crystal molecules, so that the direction of the long axes of the QRs close to the side of the first substrate is the same as the polarization direction of the first polarizer; the LCD panel is in a first state of brightness;
  when the TFTs are not fully opened, the QRs, along with the liquid crystal molecules, align in a twisted manner spanning from the second substrate to the side of the first substrate; under the light of the backlight source, the polarization direction of the second polarizer and the long axes of the QRs close to the side of the second substrate form a set angle; the QRs turn with the liquid crystal molecules, so that the long axes of the QRs close to the side of the first substrate and the polarization direction of the first polarizer form a set angle; the LCD panel is in a second state of brightness;
  when the TFTs are fully opened, the QRs, along with the liquid crystal molecules, turn to align perpendicularly to the first substrate spanning from the second substrate to the side of the first substrate; under the light of the backlight source, the polarization direction of the second polarizer is perpendicular to the long axes of the QRs close to the second substrate, while the long axes of the QRs close to the first substrate is perpendicular to the polarization direction of the first polarizer; the LCD panel is in a third state of brightness;
  wherein the first state of brightness is larger the second state of brightness, and the second state of brightness is larger than the third state of brightness.

12. The LCD panel of claim 8, wherein spacers are disposed on the first substrate;
  the material of the spacers is the same as the isolators.

13. A method of forming a liquid crystal display (LCD) panel as claimed in claim 8, comprising:
  forming isolators on the first substrate through lithography;
  dripping the liquid crystal molecules mixed with the red quantum rods (QRs) to the position corresponding to the red pixels, and the liquid crystal molecules mixed with the green QRs to the position corresponding to the green pixels by means of ink-jetting, wherein the liquid crystal molecules are mixed with at least the red and green QRs.

14. The method of claim 13, wherein the liquid crystal molecules are further mixed with blue QRs; dripping the liquid crystal molecules mixed with the blue QRs to the position corresponding to the blue pixels by means of ink-jetting.

15. The method of claim 13, wherein dripping the liquid crystal molecules that are not mixed with the QRs to the position corresponding to the blue pixels by means of ink-jetting.

16. The method of claim 13, wherein the second substrate further comprises a switch array layer comprising a plurality of thin film transistors (TFTs); a second polarizer is disposed on an external side of the second substrate, and a first polarizer is disposed on an external side of the first substrate;
  when the TFTs are closed, the QRs, along with the liquid crystal molecules, align in a twisted manner spanning from the second substrate to the side of the first substrate; under the light of the backlight source, the polarization direction of the second polarizer is the same as the long axes of the QRs close to the side of the second substrate; the QRs rotate with the liquid crystal molecules, so that the direction of the long axes of the QRs close to the side of the first substrate is the same as the polarization direction of the first polarizer; the LCD panel is in a first state of brightness;

when the TFTs are not fully opened, the QRs, along with the liquid crystal molecules, align in a twisted manner spanning from the second substrate to the side of the first substrate; under the light of the backlight source, the polarization direction of the second polarizer and the long axes of the QRs close to the side of the second substrate form a set angle; the QRs turn with the liquid crystal molecules, so that the long axes of the QRs close to the side of the first substrate and the polarization direction of the first polarizer form a set angle; the LCD panel is in a second state of brightness;

when the TFTs are fully opened, the QRs, along with the liquid crystal molecules, turn to align perpendicularly to the first substrate spanning from the second substrate to the side of the first substrate; under the light of the backlight source, the polarization direction of the second polarizer is perpendicular to the long axes of the QRs close to the second substrate, while the long axes of the QRs close to the first substrate is perpendicular to the polarization direction of the first polarizer; the LCD panel is in a third state of brightness;

wherein the first state of brightness is larger the second state of brightness, and the second state of brightness is larger than the third state of brightness.

17. The method of claim 13, wherein spacers are disposed on the first substrate; the material of the spacers is the same as the isolators.

\* \* \* \* \*